Sept. 23, 1969   D. P. HASS   3,468,392
VEHICLE SAFETY DOOR LATCH RESPONSIVE TO CRASH CONDITIONS
Filed June 27, 1967
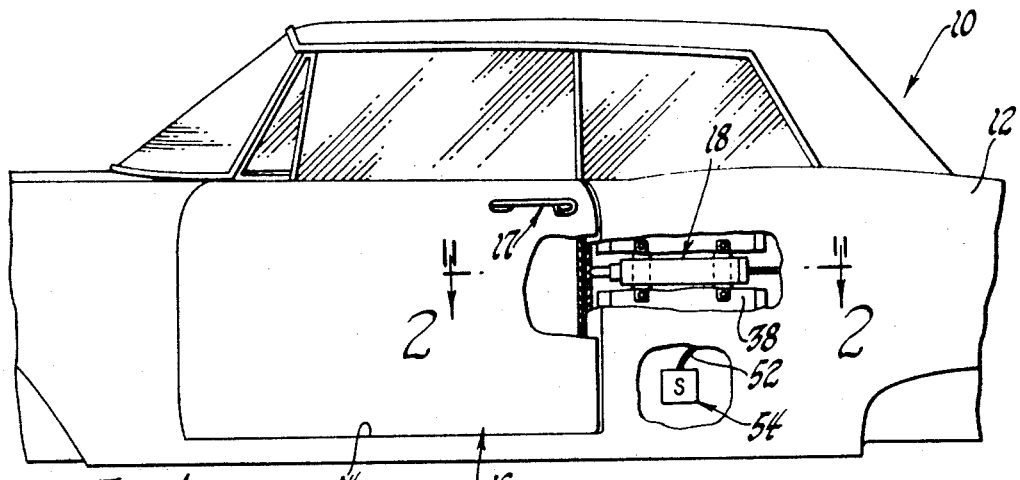
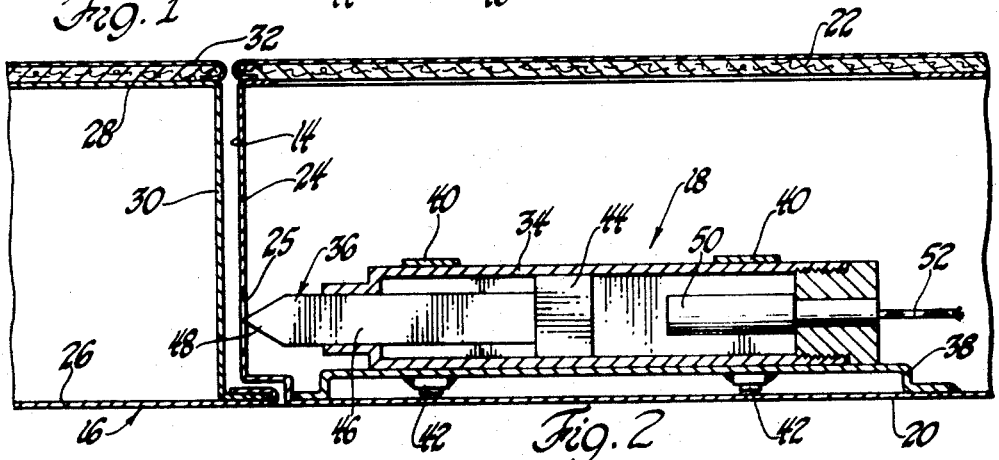
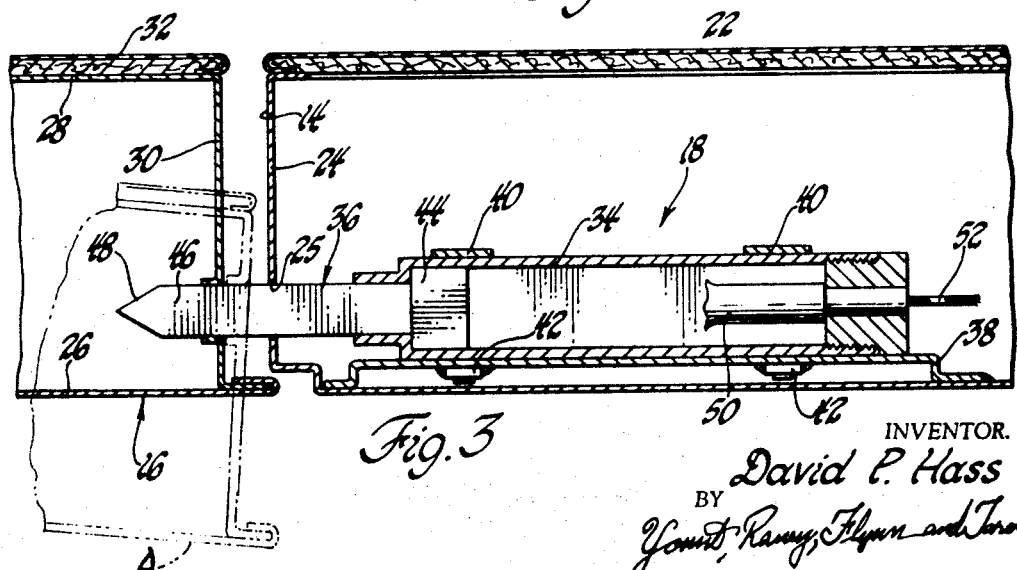
INVENTOR.
David P. Hass
BY
Yount, Ramy, Flynn and Torelli
ATTORNEYS

United States Patent Office 3,468,392
Patented Sept. 23, 1969

3,468,392
VEHICLE SAFETY DOOR LATCH RESPONSIVE TO CRASH CONDITIONS
David P. Hass, Detroit, Mich., assignor to Eaton Yale & Towne Inc., Cleveland, Ohio, a corporation of Ohio
Filed June 27, 1967, Ser. No. 649,250
Int. Cl. B60r 21/00; E05c 1/06
U.S. Cl. 180—112                              7 Claims

ABSTRACT OF THE DISCLOSURE

A vehicle is provided with a safety door latch mechanism in addition to the normal door latch mechanism. The vehicle safety door latch mechanism holds the vehicle door in a position blocking the door opening so that the occupant of the vehicle is not thrown therefrom when the vehicle encounters a crash condition. The safety door latch mechanism includes a latch member carried by the vehicle body and which moves into latching engagement with the door of the vehicle. A sensing means is provided for sensing when the vehicle encounters a crash condition and the sensing means actviates an explosive which effects movement of the latch member. The latch member has a metal piercing end which pierces the metal of the door upon movement thereof and is operable to engage and hold the door in a position blocking the opening, even though the door and body is moved relatively due to the crash and the door is ajar.

---

The present invention relates to a vehicle door latch mechanism, and particularly to a latch mechanism operable to hold a vehicle door in a position blocking the door opening so that an occupant of the vehicle will not be thrown from the vehicle when the vehicle is involved in a crash.

The ejection of occupants from automobiles during accidents is known as a substantial cause of injuries to the occupants. This ejection, of course, occurs when the doors of the vehicle open during the crash. The normal door locking mechanism which is provided on an automotive vehicle will provide for holding the door of the vehicle closed; however, the normal door locking mechanism is not designed for holding the door closed against the forces which are normally encountered in a crash situation. Moreover, the body and doors of the vehicle frequently deform during certain crash situations thereby rendering the normal locking mechanism ineffective for holding the door closed in such a crash situation. Also, known emergency locking mechanisms are rendered ineffective when the door is ajar. The present invention is effective in locking the door in an emergency situation even when the door is ajar.

Accordingly, the principal object of the present invention is the provision of a new and improved mechanism which greatly adds to the safety of the occupant of the vehicle by substantially minimizing the opening of the door of the vehicle during a crash situation.

A further object of the present invention is the provision of a new and improved vehicle safety door latch mechanism, in addition to the normal door locking mechanism provided on the vehicle, and which is operable to securely hold the door of the vehicle in a position blocking the door opening when the vehicle encounters a crash condition and which operates even though the door may be ajar.

Another object of the present invention is the provision of a new and improved vehicle safety door latch mechanism which operates in conjunction with the normal door latch of the vehicle and which is operable to interconnect the vehicle body and the vehicle door to hold the door in a position blocking the door opening, even though the door and vehicle body may have moved relatively as a result of the crash condition and the door may be ajar.

Still another object of the present invention is the provision of a new and improved vehicle safety mechanism for securing the door of a vehicle in a position blocking the door opening and which includes a latch member and means for moving the latch member with an explosive-like suddenness into locking association with the door.

In general, these and other objects and features of this invention are attained in the preferred embodiment of the present invention which includes a housing with an elongated member slidably disposed therein. The elongated member has a piston portion slidably disposed in the housing and a smaller portion which extends from the housing. An explosive charge is disposed in the housing and the housing is adapted to be attached either to the vehicle body or a door so that upon activation of the explosive charge, the elongated member is moved to a position to coact with the door and the body to prevent the door from moving to the open position when the vehicle encounters a crash condition. Any appropriate means including manual actuation means may be utilized to detonate the explosive charge; however, in the preferred embodiment, a sensor activates the explosive charge in response to a predetermined operating condition of the vehicle. The sensor may be accelerometer or an inertia switch which senses the initial stages of a crash to activate the explosive charge, thereby moving the elongated member to a position coacting with the door and the body of the vehicle.

Other objects and attendant advantages of the present invention will be readily appreciated as the same becomes better understood by reference to the following detailed description when considered in connection with the accompanying drawings wherein:

FIG. 1 is a fragmentary view of a vehicle incorporating a preferred embodiment of the instant invention;

FIG. 2 is an enlarged cross-sectional view taken substantially along line 2—2 of FIG. 1; and FIG. 3 is an enlarged cross-sectional view similar to FIG. 2 but showing a moved position.

Referring now to the drawings, wherein like numerals indicate like or corresponding parts throughout the several views, a vehicle assembly is generally shown at 10 in FIG. 1. The vehicle 10 includes a body 12 having an opening 14 therein. A closure means comprises the door 16 is operatively attached to the body 12 by hinges, or the like, and is movable between a closed position, as illustrated in FIG. 1, or blocking the opening 14, and an open position for allowing movement into and out of the body 12 through the opening 14. A safety latch means, generally indicated at 18, is operable to coact with the door 16 and the body 12 to hold the door in the closed position for preventing the door from opening to the open position when the vehicle encounters a crash condition. The normal door locking machanism is generally indicated at 17 and is one of various types well known in the prior art.

As illustrated in cross section in FIGS. 2 and 3, the body 12 has an exterior wall 20 and is padded on the interior thereof by the material 22. The body also includes an inwardly extending flange 24.

The door 16 includes an outer wall 26, an inner wall 28, and an interconnecting wall 30. The door 16 also includes cushioning material 32 disposed on the inner wall 28.

The safety latch means 18 includes a housing 34 which slidably supports an elongated member, generally indicated at 36. The housing 34 is secured to a bracket 38 by the straps 40 which are riveted or otherwise secured, as indicated at 42, to the bracket 38.

The elongataed member 36 includes a piston 44 which is slidably disposed in the housing 34 and a smaller portion 46 extending exteriorly of the housing 34. The end of the elongated member 36 which extends from the housing 34 is sharp for piercing metal or the like, as indicated at 48. The wall 24 has an aperture 25 therein for allowing the elongated member 36 to pass therethrough for engaging the door 16.

An explosive means 50 is disposed in the chamber formed by the housing 34. An electrical lead 52 carries a current for activating or detonating the explosive means 50. Upon detonation of the explosive means 50, the piston 44 is moved to the left to the position illustrated in FIG. 3. When the explosive means 50 is detonated and the elongated member 36 moves to the left, the sharp end 48 pierces the metal of the wall 30 in the door 16. The deformation of the metal in the wall 30 grips or binds the elongated portion 46 to prevent the elongated member 36 from moving back toward the position illustrated in FIG. 2. The elongated portion 46 may be provided with barbs or ribs, not shown, to assist in preventing movement toward the position illustrated in FIG. 2.

A sensing means is generally indicated at 54 in FIG. 1. The sensing means 54 detonates the explosive means 50 in response to a predetermined operating condition of the vehicle 10. The sensing means 54 may be an accelerometer or an inertia switch which senses the initial stages of a crash to detonate the explosive means 50, thereby moving the elongated member 36 to the position illustrated in FIG. 3 to prevent the door 16 from opening. An example of such a sensing means is disclosed in copending application Ser. No. 562,289 filed in the means of Sidney Oldberg and William R. Carey on July 1, 1966, now Patent No. 3,414,292 and assigned to the assignee of the instant invention. It will be understood, however, that instead of utilizing a sensing means 54 to automatically detonate the explosive means 50, an appropriate manually actuated device may be utilized to detonate the explosive means 50.

As illustrated, the latch means 18 it attached to the vehicle body 12; however, it will be readily apparent to those of ordinary skill in the art that the latch means 18 may be also attached to one of the walls in the door 16 so that the elongated member 36 moves from the door 16 and into the body 12.

From the above, it should be apparent that in response to a crash condition being sensed the elongated member 36 is moved with explosive-like suddenness and pierces the metal forming the portion 30 of the door and, thus, securely holds the door in a closed position. The member 36 will effect a piercing of the metal portion 30 and effect a holding of the door as long as the portion 30 of the door is located so as to be engaged by the member 36.

Accordingly, in the event that the door 16 would be ajar or in the event that the door is moved to a position slightly ajar during the crash condition, such as indicated schematically in dotted lines in FIG. 3 and designated A, the member 36 would still upon actuation of the explosive 50 pierce the metal portion 30 of the door and hold the door in a closed position. Furthermore, a deformation of the door and body of the vehicle which would cause a spacing of the door and the body, such as shown in full lines in FIG. 3, would not prevent the safety latch mechanism from operating. The safety latch mechanism would operate to pierce the metal portion 30 of the door and effect a holding of the door in a position blocking the door opening. In fact, the safety latch mechanism 18 will operate to hold the door in a closed position as long as the portion 30 of the door faces the portion 24 of the body when the member 36 moves to its actuated position and as long as the portion 30 has not been deformed to such an extent that the length of the member 36 would not be sufficient to traverse the space between the door and body.

The invention has been describd in an illustrative manner and it should be understood that the terminology that it used is intended to be in the nature of description rather than limitation.

Having described my invention, I claim:

1. In a vehicle, a vehicle body having an opening, a closure member for said opening movable between an open position and a closed position, closure latch means operatively associated with said closure member and said body to hold said closure member in said closed position, and a safety latch mechanism independent of said closure latch means and operatively associated with said closure member and said body and operable to secure said closure member in a position blocking said opening in the event the vehicle encounters a crash condition, said safety latch mechanism including a movable member, said movable member having means to interconnect said body and closure member when said closure member is in an ajar position intermediatae said open and closed positions and to hold said closure member in said ajar position.

2. In a vehicle as defined in claim 1 wherein said safety latch mechanism further includes sensing means for sensing said crash condition, and explosive means for moving said member and actuated by said sensing means.

3. In a vehicle, a vehicle body member having an opening therein, a closure member for said opening movable relative to said body member between an open position and a closed position, said closure member having positions intermediate said open and closed positions wherein said closure member blocks said opening, said closure member having a portion facing a portion of said vehicle body when in its closed position and certain of said intermediate positions, and a safety mechanism for securing said closure member in one of said last-mentioned closed and intermediate positions wherein said portion of said closure member faces said portion of said vehicle body member and operable when the vehicle encounters a crash condition, said safety mechanism including a latch member carried by one of said members and movable into locking association with said facing portion of the other of said members, means for moving said member with explosive-like suddenness into said locking association, and said latch member comprising an elongated member having a mental piercing end which pierces said facing portion of said other member upon activation of said means for moving said member.

4. In a vehicle as defined in claim 3 further including a housing supporting said member, said member having one end in the form of a piston slidably disposed in the housing, and said means for moving said member comprising explosive means located in said housing to apply a force to said piston to effect movement of said elongated member upon activation thereof.

5. A vehicle safety mechanism for securing a door member of an automative vehicle in a position blocking a door opening in a vehicle body member in the event the vehicle encounters a crash condition, said mechanism comprising sensing means for sensing the crash condition, at latch member carried by one of said members, said other member having a rigid surface disposed in opposed relationship to said latch member, said latch member having means for piercing said rigid surface, and explosive means carried by said one member and responsive to said sensing means for propelling said latch member toward said rigid surface to enable said means to pierce said rigid surface whereby said door and body members are maintained in a latched relationship.

6. In a vehicle, a vehicle body having an opening, a closure member for said opening movable between an open position and a closed position, a closure latch means operatively associated with said closure member and said body to hold said closure member in said closed position, and a safety latch mechanism independent of said closure latch means and operatively associated with said closure member and said body and operable to secure said closure member in a position blocking said opening in the event the vehicle and closure member when said closure member is in said closed position as well as when said closure member is in an an ajar position intermediate said open and closed positions tand to hold said closure member in said ajar position, sensing means for sensing said crash condition, and explosive means for moving said member and actuated by said sensing means, said closure member having a metal-like portion facing the portion of said body mounting said member when said closure member is closed and when said closure member is ajar and wherein said member is mounted on said body and comprises an elongate member having a metal piercing end which pierces said metal-line portion of said closure member upon activation of said explosive means.

7. A vehicle safety mechanism for securing a door member of an automotive vehicle in a position blocking the door opening in the vehicle body member in the event the vehicle encounters a crash condition comprising sensing means for sensing the crash condition, at latch member carried by one of said members and movable relative to said one member into a latched position in latching engagement with the other of said members, and explosive means carried by said one member and responsive to said sensing means sensing said crash condition for moving said latch member into said latched position, said latch member comprising an elongate member having a metal piercing end, and said explosive means for moving said latch member moves said latch members with a force causing said elongate member to pierce the metal material of said other member.

References Cited
UNITED STATES PATENTS

| | | | |
|---|---|---|---|
| 2,804,159 | 8/1957 | Gavito | 180—112 |
| 3,029,892 | 4/1962 | Romanski | 180—113 |
| 3,151,698 | 10/1964 | Pollock | 180—113 |

A. HARRY LEVY, Primary Examiner

U.S. Cl. X.R.

280—150; 292—138

PO-1050
(5/69)

UNITED STATES PATENT OFFICE
CERTIFICATE OF CORRECTION

Patent No. 3,468,392      Dated September 23, 1969

Inventor(s) David P. Hass

It is certified that error appears in the above-identified patent and that said Letters Patent are hereby corrected as shown below:

Column 4, line 62, for "at" read -- a --.
Column 5, line 5, at the end thereof insert -- encounters a crash condition, said safety latch mechanism including a member movable to interconnect said body --; column 5, line 9, for "tand read -- and --; column 5, line 24, for "at" read -- a --.

SIGNED AND
SEALED
JAN 20 1970

(SEAL)
Attest:

Edward M. Fletcher, Jr.
Attesting Officer

WILLIAM E. SCHUYLER, JR.
Commissioner of Patents